Sept. 21, 1965 R. J. ANGSTEN 3,206,994
SCREW JACK BRAKE DEVICE
Filed Nov. 19, 1963
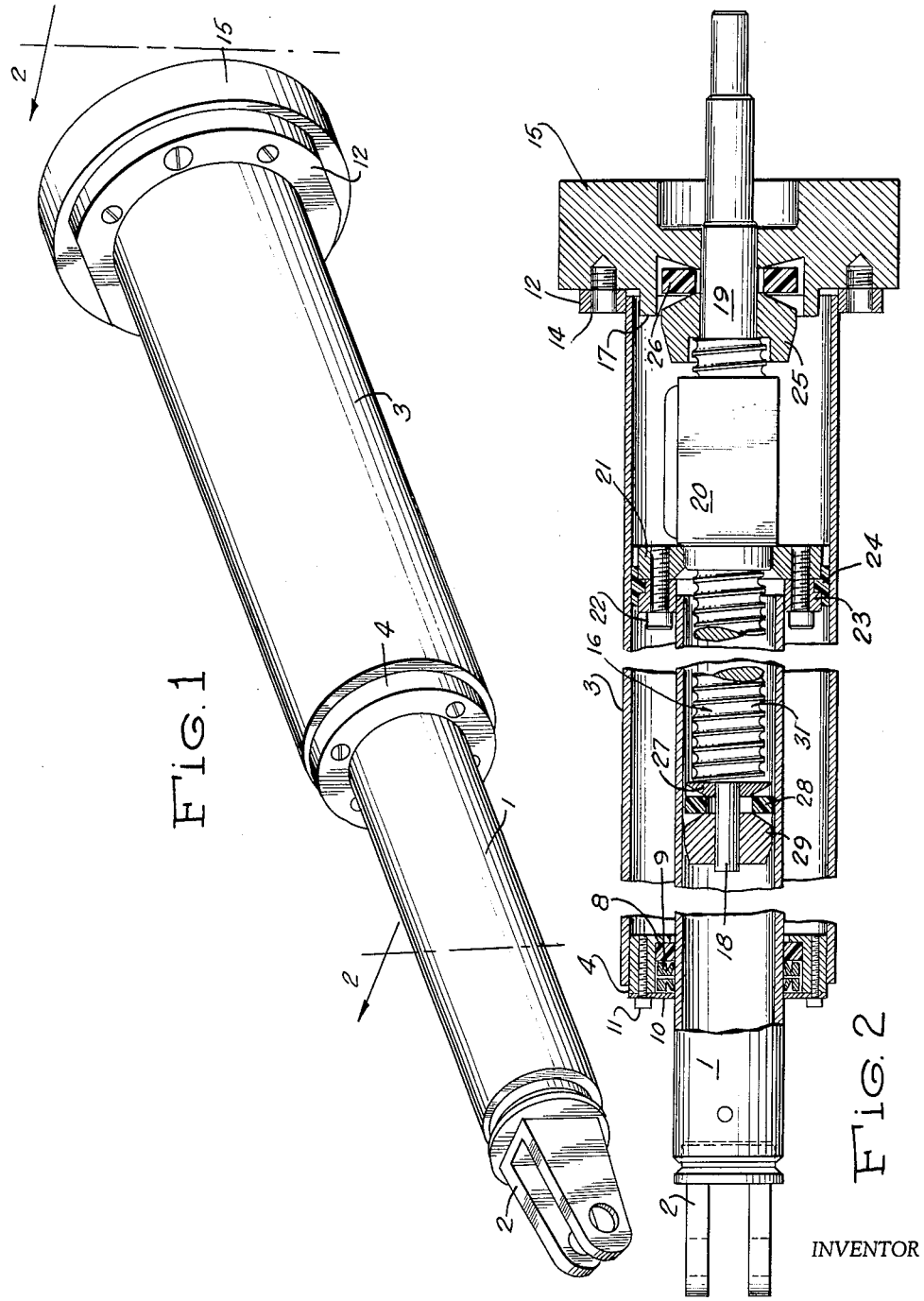
INVENTOR
ROBERT J. ANGSTEN
BY *Joseph A. Hill*
ATTORNEY

United States Patent Office 3,206,994
Patented Sept. 21, 1965

3,206,994
SCREW JACK BRAKE DEVICE
Robert J. Angsten, Southfield, Mich., assignor to the United States of America as represented by the Secretary of the Army and/or the Administrator of the Federal Aviation Agency
Filed Nov. 19, 1963, Ser. No. 324,901
7 Claims. (Cl. 74—424.8)

This invention relates to load lifting devices and more particularly to improvements in screw jack assemblies.

Such assemblies consist generally of a screw shaft having a traveling nut which traverses along the shaft upon rotation thereof. The nut is connected to a load whereby the motion of the nut is imparted to the load. Such devices are generally operated by electrical motors and are equipped with conventional control or cut-off means to insure that rotation of the shaft is stopped before the traveling nut reaches either end of the screw shaft. It is obvious that such control means are necessary since continued rotation of the shaft after the nut has reached the end thereof could result in damage to shaft, nut, load and the end structures of the screw jack itself.

Prior art devices have relied solely upon various external control systems to cut off power to the motor, disengage the screw shaft from the motor, or apply a braking action when the traveling nut passes certain limits. Such systems, however, are still unsatisfactory since they do not provide fail-safe means to stop the rotation of the shaft should some malfunction occur in the control system itself, thereby permitting continued rotation of the shaft after the nut has passed the cut-off limits.

In addition, when heavy loads are connected to the jack, the inertia of the load, together with the rotating inertia of the drive system, causes continued rotation of the shaft after the power is cut off and the end structure of the jack must absorb the kinetic energy of the moving load. When the traveling nut encounters the rigid end structure, the energy must be arrested in what amounts to a zero period of time. In theory, neglecting deflections and deformation of the jack structure, this amounts to resisting an infinite force.

Accordingly, it is an object of this invention to provide simple, self-contained means for protecting screw jacks from damage caused by overrotation.

It is another object of this invention to provide a screw jack assembly that may be used in conjunction with conventional control systems and still protect itself from damage caused by malfunctions of the control system.

The above and other objects and advantages of the invention will be apparent from the following description reference being made to the accompanying drawings wherein:

FIG. 1 is a perspective view of a screw jack, in its retracted position, embodying the instant invention; and FIG. 2 is a vertical section of the device shown in FIG. 1 taken along the lines 2—2 of FIG. 1.

Referring now to FIGS. 1 and 2, a screw jack embodying the instant invention comprises an extendable hollow tubular member 1 having a clevis 2 or other suitable means for connection to a load at its lower end. The tubular member 1 is mounted concentrically within an outer tubular housing 3 in such a manner as to permit the tubular member to move along the axis of the housing 3. The lower end of the housing 3 is provided with an annular retainer 4 welded to the housing 3 through which the tubular member 1 passes. The lower end of housing 3 is sealed by means of guide 8 and seal 9 within a recess in retainer 4 and surrounding the tubular member 1. Guide 8 and seal 9 are held in place by plate 10 mounted on retainer 4 by means of bolts 11. The guide is made of polychlorotrifluoroethylene meeting Military Specification Number MIL–F–55028 or other suitable material which acts as a bearing surface for tubular member 1. The upper end of the housing 3 is provided with a flange 12 welded thereto and provided with circumferentially disposed holes through which pass screws 14 for attachment to anchor 15. Anchor 15 may be mounted by welding or other suitable means to the structural support for the screw jack assembly. Anchor 15 is provided with a central hole adapted to receive the upper, unthreaded portion 19, of the screw jack shaft 16. The inner or lower face of the anchor carries an annular lip 17 whose outer diameter is slightly smaller than the inside diameter of the housing 3. The inner face of the anchor is undercut thereby forming an annular recess with lip 17. It is desirable that the face of the recess taper outwardly from the center so that the side wall of the recess forms an acute angle with the face, creating a wedge-shaped recess.

The screw jack shaft 16 has a lower unthreaded portion 18, a threaded central portion 31 which is slightly longer than the load moving distance for which the jack is designed and an unthreaded upper portion 19. The screw jack shaft is mounted concentrically within the tubular member 1 and carries a traveling nut 20 in threaded engagement therewith on the threaded portion thereof. The traveling nut is welded or otherwise fixed to adaptor 21 which is provided with holes for receiving screws 22 whereby the adaptor 21 is connected to flange 23. Flange 23 is welded to the upper end of tubular member 1. Both the adaptor and the flange 23 are smaller in diameter than the inside of housing 3. A lip is provided on flange 23 which when assembled with adaptor 21 provides a circumferential recess in which is mounted guide 24. As will be apparent later from the description of the operation of this invention, it is necessary that traveling nut 20 and tubular member 1 be prevented from rotating when the screw shaft 16 rotates. In most cases, the connected load, hence tube 1 and nut 20, will be unable to rotate. Otherwise, to accomplish this guide 24, which may be made of the same material as guide 8 set forth above, has a diameter which is large enough to exert a sufficient frictional force against housing 3 to prevent rotation of the nut 20 and yet not interfere noticeably with the travel of nut 20 along the shaft. This frictional force must be greater than the torque applied to the screw shaft 16. It is readily apparent, however, that other means such as a tongue and groove, guide rods or a key and keyway can also be used to prevent rotation of the nut 20 with respect to housing 3.

The upper unthreaded portion 19 of the shaft passes through anchor 15 and is adapted at its upper end for connection to suitable means for supplying rotary motion to the shaft. The upper unthreaded portion of the shaft within housing 3 has a sliding member 25 mounted thereon, rotating with said shaft while being capable of longitudinal sliding motion along the shaft. This can be accomplished by means of a key and keyway (not shown). The lower face of sliding member 25 is provided with an annular recess permitting the member to receive the threaded portion of the shaft. The diameter of sliding member 25 is slightly smaller than the diameter of the recess in anchor 15. A brake 26 made of a flexible, resilient, rubber-like material is mounted loosely on the shaft between member 25 and anchor 15. A solid polyurethane rubber, Shore "A," Durometer 90, is particularly suitable as the brake material, however, it is readily apparent that many other natural and synthetic rubber-like materials possess similar physical characteristics and may be used for making the brake.

The lower, unthreaded end 18 of screw shaft 16 is also provided with a sliding member 27, slightly smaller in diameter than the inside of tubular member 1. Member 27 is mounted immediately adjacent the threaded portion 16 of the shaft in a manner similar to member 25 so that it rotates with the screw shaft, but is capable of sliding along the unthreaded portion of the shaft. The lower face of member 27 may taper outwardly as shown in FIG. 2. Immediately adjacent to sliding member 27 is brake 28 loosely mounted on the shaft and similar in material to brake 26. A stop 29 is fixedly mounted on the lower end of the shaft by, for example, a set screw (not shown).

In utilizing the jack of this invention, it would normally be provided with conventional control means to limit the travel to approximately ½ inch less than the length of the threaded portion of the screw shaft at each end. A typical suitable control means is described in U.S. Patent No. 2,387,799, R. W. Leland, October 30, 1945, but other means known to the art can also be used.

When counterclockwise rotation is applied to the upper end 19 of the screw shaft, traveling nut 20 moves downwardly along the shaft thereby extending tubular member 1 which is connected to a load. When the nut 20 reaches a point about ½ inch from the lower end of threaded portion of the shaft 16 the control means referred to above would normally come into operation and stop rotation of the shaft. However, should the control means fail, the nut 20 will continue to travel down the shaft until the lower face of the nut 20 comes in contact with the upper face of member 27. Continued rotation of the shaft 16 causes the nut 20 to force member 27 into brake member 28 causing compression of brake 28 into the wedge-shaped space formed by the upper and lower faces of stop 29 and member 27 respectively. This compression serves two functions. First of all, it provides a distance of travel for the nut through which the kinetic energy of the system can be absorbed. Secondly, the brake member is deformed so that it exerts friction forces, sufficient to overcome the rotational force on the shaft on the inner wall of tubular member 1 and the faces of sliding member 27 and stop 29. Since tubular member 1 cannot rotate, it acts as a stationary brake drum and the motor driving the shaft is stalled.

In a similar manner upon clockwise rotation of the shaft 16, if the control means fail to stop the shaft when nut 20 is within ½ inch of the upper end of the threaded portion of the shaft; the upper face of nut 20 will abut the lower face of member 25. Continued rotation of the shaft will force member 25 into brake 26 causing deformation thereof and producing the same effect as described with respect to the brake 28.

In a specific application of this invention the screw jack can be used to raise and lower the movable passenger transition device of the airport mobile lounge such as is illustrated in U.S. Patent No. 3,083,784, C. A. Urian, April 2, 1962. In this system a motor supplying 15 pound feet of torque to the shaft is capable, by choosing suitable thread configuration, of exerting 4,000 pounds of tension on the load. In order to provide sufficient travel to absorb the kinetic energy of the system the brake members were made approximately 7/16 inch thick and provided approximately ¼ inch of travel through which the kinetic energy of the system was gradually absorbed. The torsional braking force exerted was greater than the torque of the motor and stalling occurred.

It is thus seen that the invention provides an economical, fool-proof system for braking a screw jack assembly which is sturdy and self-contained. While one embodiment has been disclosed for purposes of illustration, various embodiments and modifications are within the scope of the invention and the disclosure should not be construed as limiting the invention to the specific embodiment shown.

I claim:
1. In a screw jack assembly comprising a rotatable threaded shaft having a traveling nut threadably mounted thereon the improvement which comprises a sliding member mounted on the screw shaft between the end thereof and the traveling nut and adjacent to said nut, said member being mounted so as to permit the member to move longitudinally along the shaft while rotating with the shaft; a flexible, resilient brake loosely mounted on said shaft adjacent said sliding member and a non-rotating element disposed adjacent to said brake element so as to produce frictional contact with said brake when rotation of the shaft causes the traveling nut to push the sliding member into contact with the brake, the area of contact between the sliding member, the brake, and the non-rotating member being sufficient to create a frictional force greater than the rotational force on the shaft.

2. In a screw jack assembly comprising a rotatable, threaded shaft having a traveling nut threadably mounted thereon the improvement comprising a first sliding member mounted on the screw shaft between the traveling nut and the adjacent end, said first sliding member being mounted so as to permit longitudinal movement along the shaft while rotating with the shaft; a first flexible, resilient brake loosely mounted on said shaft adjacent said first sliding member, a non-rotating element disposed adjacent said brake, a stop fixedly mounted on said shaft at the end opposite said sliding member, a second flexible, resilient brake loosely mounted on said shaft adjacent said stop and a second sliding member for rotation with said threaded shaft adjacent said second brake, said first and second sliding members producing frictional contact with said first and second brakes, respectively, counterclockwise rotation of said threaded shaft producing ultimate engagement of said traveling nut with said second sliding member to compress said second brake means with said stop means and clockwise rotation of said threaded shaft producing ultimate engagement of said traveling nut with said first sliding member to compress said first brake means with said non-rotating element, to overcome rotational motion of the screw shaft and gradually absorb the kinetic energy of the jack.

3. A screw jack assembly as in claim 2 wherein the faces of the stop and the first sliding member adjacent to the brakes are tapered outwardly from the center whereby the radial deformation of the brakes upon compression is increased.

4. A screw jack assembly as in claim 1 wherein said screw shaft passes through a hole in the non-rotating member, the face of said non-rotating member adjacent to said brake being provided with a recess adapted to receive the brake.

5. A screw jack assembly as in claim 4 wherein the faces of the recess and the sliding member adjacent to the brake member taper outwardly from the center forming an annular volume having a wedge shaped cross section enclosing said brake.

6. A screw jack assembly comprising a housing having a first end and a second end, a tubular load bearing member mounted within said housing and extending from the first end thereof, said load bearing member being capable of longitudinal motion with respect to said housing; a screw jack shaft having threads along a substantial portion of its length mounted within said load bearing member and extending through the second end of said housing, said portion of the shaft passing through the second end of the housing being adapted for connection to a source of rotational motion; said second end of said housing being fixedly mounted to an anchor member, said anchor being provided with a hole through which the screw jack shaft passes; a traveling nut mounted on said screw jack shaft in threaded engagement therewith and within said housing in such a manner as to be capable of longitudinal motion within said housing while being incapable of rotational motion with respect to said housing; the first end of said nut being fixedly mounted to the end of said load bearing member within said housing; a stop fixedly mounted on the end of said screw shaft within said load bearing member and slightly smaller in diameter than the inside of said load bearing member; a first brake loosely mounted on said screw jack shaft adjacent to said stop, said brake being made of a flexible, resilient material and being slightly smaller in diameter than the inside of said load bearing member; a first sliding member mounted on said shaft adjacent to said brake, said sliding member being mounted so as to rotate with said shaft while being capable of sliding longitudinally along said shaft; a second brake, of material similar to said first brake, loosely mounted on said shaft adjacent the inner face of said anchor member, the inner face of said anchor member being provided with a recess adapted to receive said brake; a second sliding member mounted on said shaft adjacent said brake, said second sliding member rotating with said shaft while being capable of sliding along said shaft and into the recess in the face of said anchor; both sliding members being so placed as to abut opposite ends of the traveling nut before each extreme of its travel is reached whereby continued rotation of the shaft will cause the nut to force each sliding member into its respetcive brake, compressing said brake between the sliding member and the stop at one end and the sliding member and the anchor recess at the other, thereby producing sufficient frictional force between, respectively, the brake and the inner surface of the load bearing member; and the brake and the adjacent faces of the sliding member and the anchor to overcome the rotational motion of the screw shaft and gradually absorb the kinetic energy of the jack.

7. The screw jack assembly as in claim 6 wherein the faces of the stop, both sliding members, and the recess in the anchor which are adjacent to said brake taper outwardly, thereby forming an annular inclosure having a wedge shaped cross section within which the brake is compressed.

References Cited by the Examiner

UNITED STATES PATENTS

| Re. 25,659 | 10/64 | Chapman et al. | 74—424.8 |
| 2,907,223 | 10/59 | Valenti | 74—424.8 |

FOREIGN PATENTS

| 779,420 | 7/57 | Great Britain. |

DON A. WAITE, *Primary Examiner.*